United States Patent
Aramburu et al.

(10) Patent No.: US 7,726,962 B2
(45) Date of Patent: Jun. 1, 2010

(54) MOLD AND METHOD FOR WORKING WITH COMPOSITE MATERIAL

(76) Inventors: Joseba Aramburu, Parque technológico de Alava, c/Leonardo da Vinci, 13, Miñano (Alava) (ES) 01510; Sergio Velez, Poligono Comarcal, Calle A s/n (Agustinos), Pamplona (Navarra) (ES) 31013

( * ) Notice: Subject to any disclaimer, the term of this patent is extended or adjusted under 35 U.S.C. 154(b) by 890 days.

(21) Appl. No.: 11/253,954

(22) Filed: Oct. 19, 2005

(65) Prior Publication Data

US 2007/0108655 A1 May 17, 2007

Related U.S. Application Data

(63) Continuation-in-part of application No. 10/292,656, filed on Nov. 12, 2002, now abandoned.

(30) Foreign Application Priority Data

Nov. 12, 2001 (ES) ................................ 200102487

(51) Int. Cl.
*B29C 35/00* (2006.01)
*B29C 35/02* (2006.01)
*B29C 35/04* (2006.01)
*B28B 1/00* (2006.01)
*B28B 11/00* (2006.01)

(52) U.S. Cl. ...................... 425/117; 425/110; 425/384; 425/394; 425/395; 425/397; 425/400; 425/442; 249/79; 249/80; 249/170; 264/241

(58) Field of Classification Search ............ 249/79, 249/170; 425/110, 117, 384, 405.1, 395, 425/408, 407, 394, 397, 400; 60/365; 264/255
See application file for complete search history.

(56) References Cited

U.S. PATENT DOCUMENTS 4,043,721 A * 8/1977 Lemelson .................. 425/116

(Continued)

FOREIGN PATENT DOCUMENTS

EP 0819654 A2 * 7/1997

(Continued)

*Primary Examiner*—Khanh Nguyen
*Assistant Examiner*—Carson Gross
(74) *Attorney, Agent, or Firm*—Sanchelima & Assoc., P.A.

(57) ABSTRACT

An apparatus and method for molding composite material with a selectable uniform predetermined temperature during most of the curing time. The mold apparatus has two cooperating and complementing mold bed assemblies hingedly mounted to each other and movable between two extreme positions, open and closed. A composite inner skin and outer skins sandwich a spacer in between. The spacer member includes interconnecting passages throughout. An outer perforated composite skin member covers the spacer member. A source for pressurized gas is applied to the mold assemblies when in the closed position. A predetermined cooperative temperature is selectably used to uniformly control the curing characteristics of the first and second skin members as the pressurized hot gas or air forced to pass through the outer skin and the spacer member adjacent to the inner skin thereby exposing the form being molded to a uniform temperature gradient. A mechanism for moving the upper mold bed assembly is provided with skates to permit its stress free movement in response to temperature expansion and contraction forces.

3 Claims, 4 Drawing Sheets

U.S. PATENT DOCUMENTS 4,267,142 A * 5/1981 Lankheet .................... 264/510
5,817,345 A * 10/1998 Koch et al. ................. 425/130

FOREIGN PATENT DOCUMENTS

| | | | |
|---|---|---|---|
| EP | 819654 A2 * | 1/1998 | |
| EP | 856900 | 9/1998 | |
| ES | 8503080 | 3/1982 | |
| ES | 2007179 | 6/1989 | |
| ES | 2089965 | 10/1996 | |

* cited by examiner

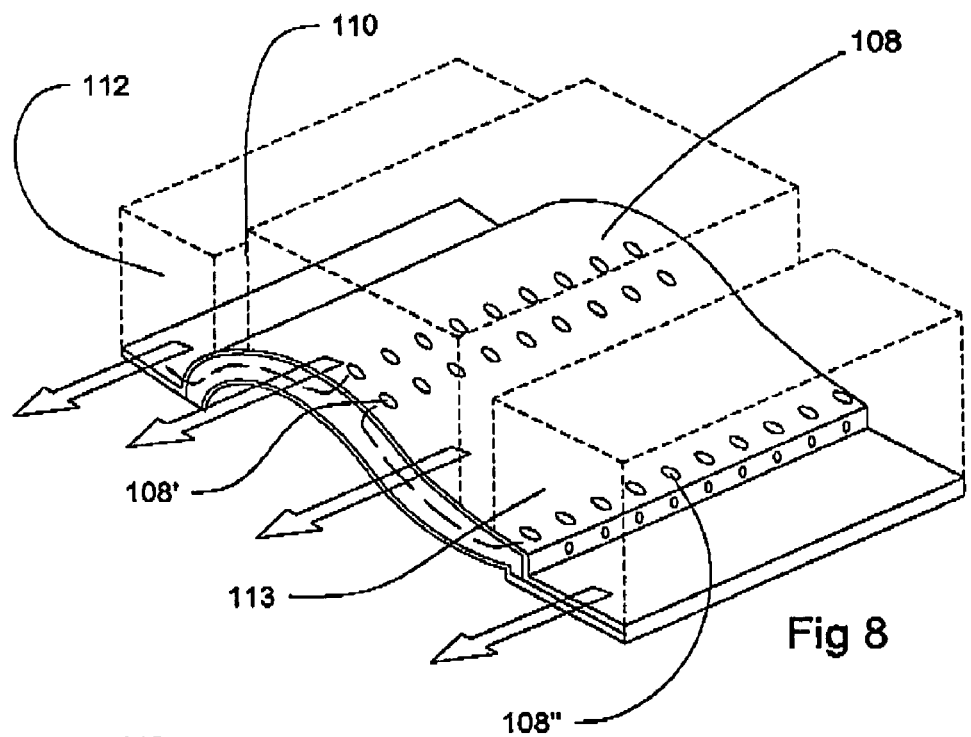
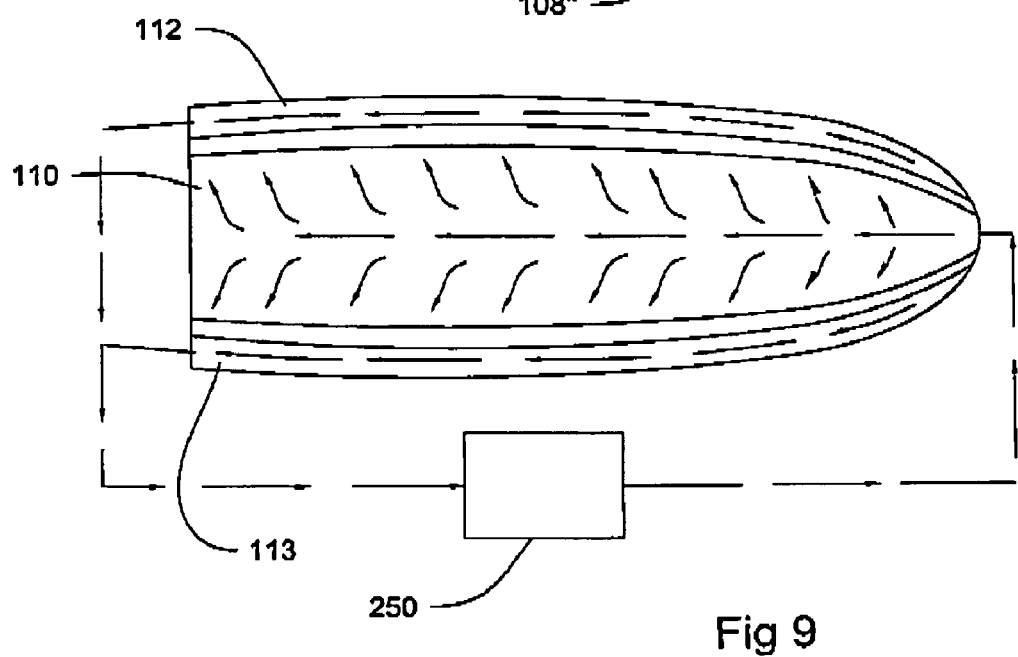

MOLD AND METHOD FOR WORKING WITH COMPOSITE MATERIAL

I. OTHER RELATED APPLICATIONS

The present application is a continuation-in-part of U.S. patent application Ser. No. 10/292,656 filed on Nov. 12, 2002 now abandoned, claiming international priority of Spanish patent No. P200102487 filed on Nov. 12, 2001.

II. BACKGROUND OF THE INVENTION

1. Field of the Invention

The present invention relates to the field of composite molding for blades used with wind generators of electricity.

2. Description of the Related Art

Many molds and techniques for working with composite materials have been developed in the past. Many of them look for different means to affect the critical process of curing the composite material being used. Most of the molds in the prior art rely on either large ovens or external ducts to control the temperature of the mold, and indirectly the temperature of the material inside the mold during setting or curing. The use of ovens for these elongated blades is clearly impractical. One of these molds is disclosed in Spanish patent No. ES 2,089,965 wherein a large oven is required. Another example of a mold used in the industry is the one disclosed in Spanish patent No. ES 2,007,179 where the two halves are subsequently attached together. The use of laminar enlargement is disclosed in Messerschmidt patent No. ES 8,503,080 with an oven. The use of fiberglass cloth with polypropilene threads or fibers is described in European patent No. EP 856,900 but, again, the molde is introduced in an oven. Some designs include mechanisms for introducing air inside the mold. One of these designs is the one disclosed by Lemelson in U.S. Pat. No. 4,043,721 for a composite body molding apparatus. The patented mold, however, uses a pipe 26 to deliver hot air inside the mold to affect the curing process. A number of holes in pipe 26 deliver the hot air in certain areas of the material but the temperature gradient is not uniform. In the present invention, on the other hand, perforated skins of the composite article being molded thereby not only obviating the need to use a pipe or other means of introducing and routing the hot air inside the mold but also the present invention achieves a more uniform temperature gradient for the article being formed.

Other patents describing the closest subject matter provide for a number of more or less complicated features that fail to solve the problem in an efficient and economical way. None of these patents suggest the novel features of the present invention.

III. SUMMARY OF THE INVENTION

It is one of the main objectives of the present invention to provide a mold and method for making articles with composite materials that permit a user to efficiently use and control the uniformity of the temperature during the curing process.

It is another object of this invention to provide a mold and process that cures the composite material with minimum interference with the article being manufactured and absorbing the expansion and contraction forces caused by temperature changes.

Yet another object of the present invention is to efficiently use the heating energy required to cure the article of the manufacture.

It is yet another object of this invention to provide such a mold that is inexpensive to manufacture and maintain while retaining its effectiveness and a method that can be readily practiced.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

Figure 2:
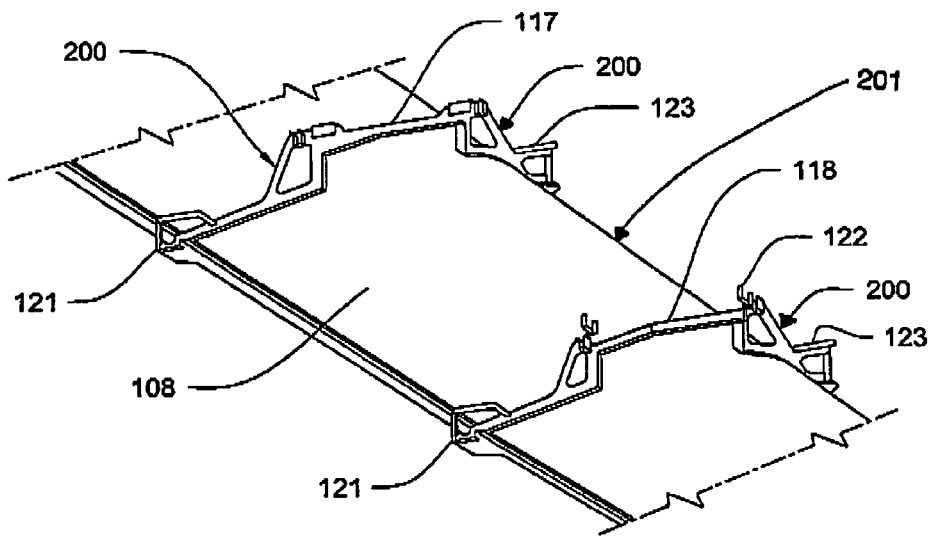
FIG. 2 shows an isometric view of the upper part of the mold.
Figure 3:
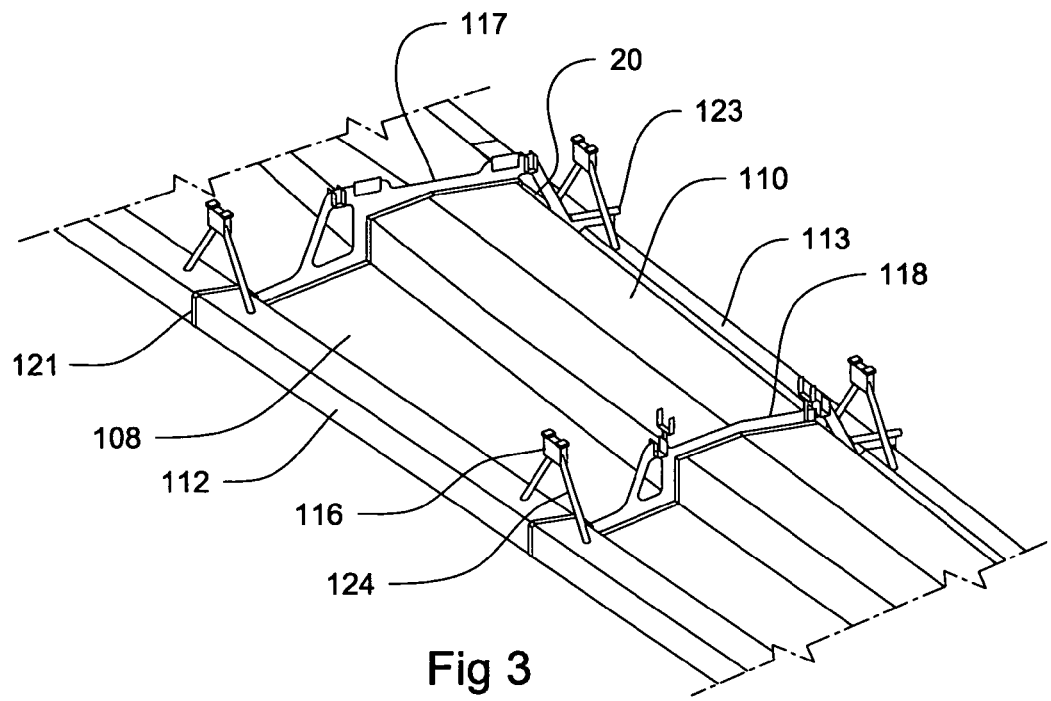

FIG. 3 corresponds the same view shown in FIG. 2 with the duct assembly.

Figure 4:
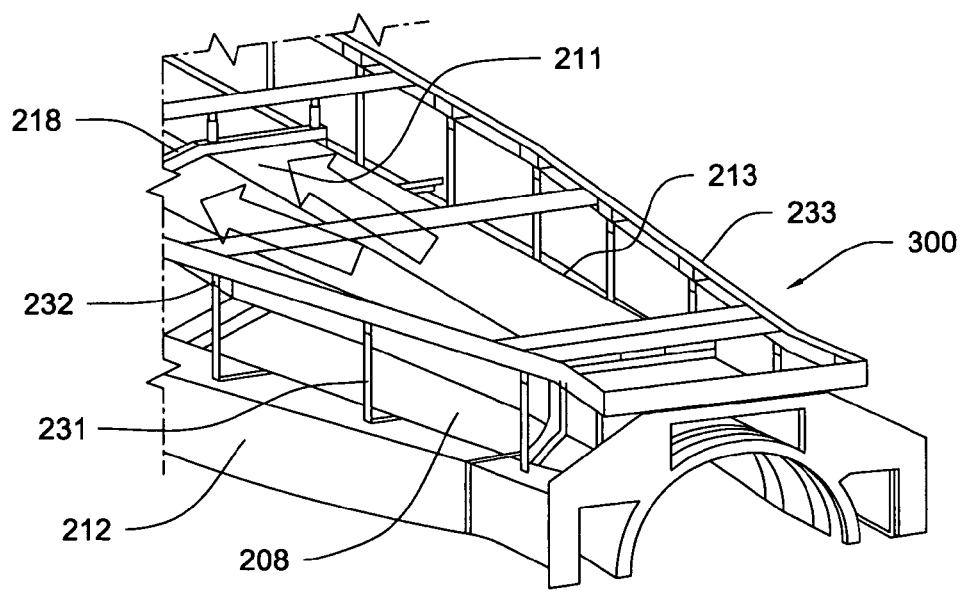

FIG. 4 is an isometric view of the underside of the mold assembly with the support structure.

Figure 5:
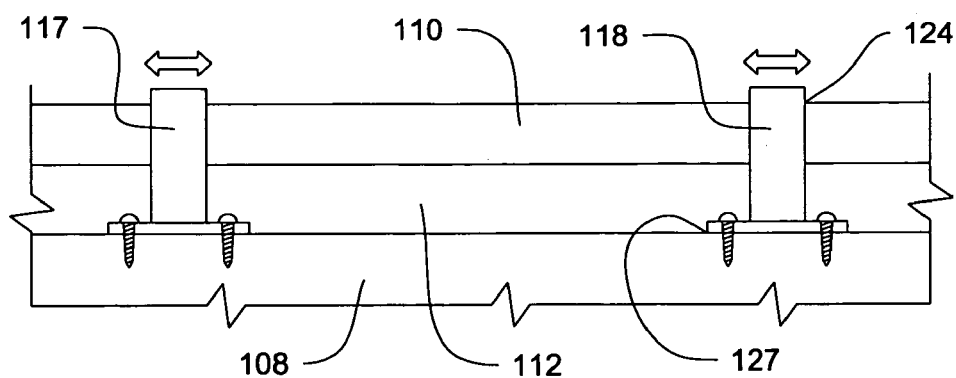

FIG. 5 is an elevational side view of a section of the mold assembly illustrating the expansion movements.

Figure 6:
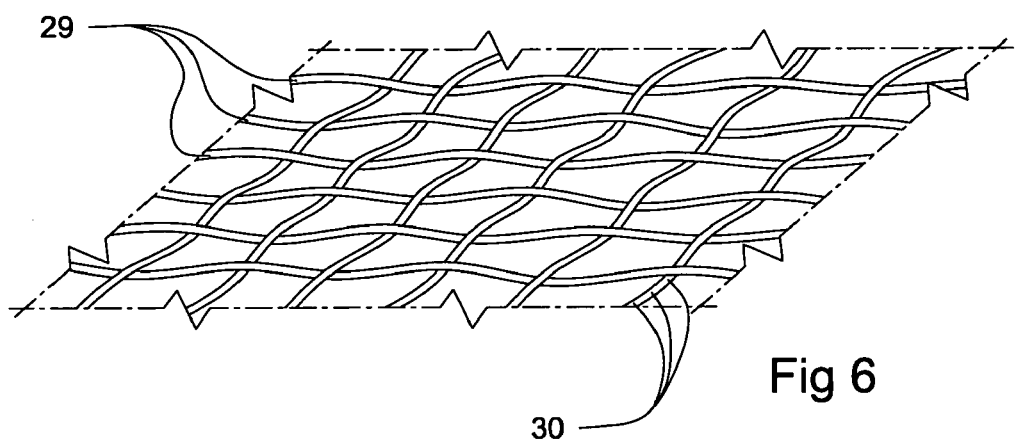

FIG. 6 is a representation of a piece of cloth or fabric with cris-crossed fibers which are in turn made out of twisted threads.

Figure 7:
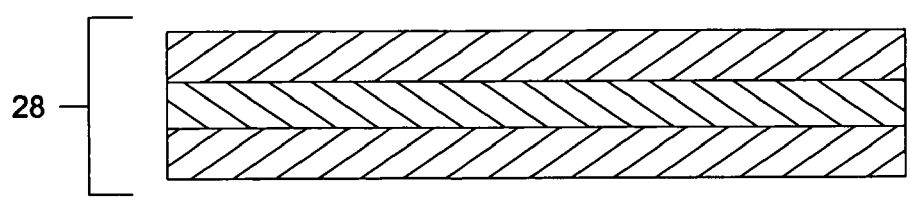

FIG. 7 is an elevational representation of a portion of three plies of the fabric shown in the previous figure oriented at 45 degrees with respect to each abutting ply.

FIG. 8 is a representation of a portion of the inner and outer skins sandwiching the space member in between and showing also the direction of the air flow.

FIG. 9 is a schematic representation of a plan view showing the direction of the air flow through the conduits.

V. DETAILED DESCRIPTION OF THE PREFERRED EMBODIMENT

Referring now to the drawings, where the present mold invention is generally referred with numeral 10, it can be seen that it basically includes upper and lower mold assemblies 102 and 202 that are hingedly mounted and cooperatively complement each other. As it can be schematically appreciated from FIG. 1, upper mold assembly 102 includes upper central conduit 110, upper lateral conduits 112 and 113, bed assembly 101 and upper support assembly 100. Similarly, mold assembly 202 includes lower central conduit 210, upper lateral conduits 212 and 213, bed assembly 201 and lower support assembly 200. Also, mechanism 206 is used for rotating mold 10 in order to support and suspend it. This facilitates the opening and closing of mold assemblies 102 and 202. Mold 10 is supported by bottom structure 200 on the underside, as it will be discussed below.

One of the applications for this invention involves molding composite articles of substantial longitudinal dimensions, such as wings and windmill blades. These long objects require a uniform temperature gradient over substantially large dimensions. The use of long ovens to raise the temperature during the curing process is understandably impractical for these long articles.

Figure 1:
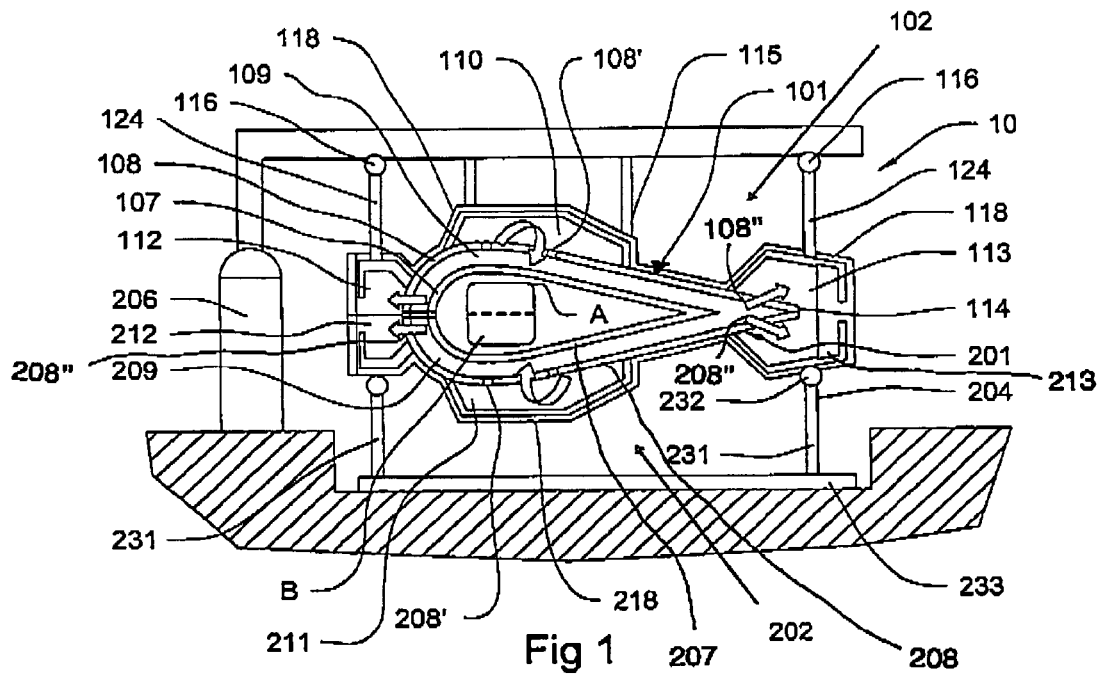
FIG. 1 is an elevational simplified representation of one of the preferred embodiments for the mold pursuant to the present invention.

As seen in FIG. 1, upper bed assembly 101 includes upper outer skin 108 mounted over an aluminum honeycomb spacer member 109 which in turn is mounted over inner skin member 107. Similarly, bed assembly 201 includes upper skin 208 mounted over an aluminum honeycomb spacer member 209 which in turn is mounted over inner skin member 207. Outer and inner skins 107, 207; 108 and 208, respectively, are preferably made out of epoxy and fiberglass materials. Several plies of fiberglass fabrics 28 with fibers 29 that include twisted threads 30 can be used to obtain the desired result, as shown in FIGS. 6 and 7. These plies can be oriented at 45 degrees to further enhance their qualities. Inside bed assemblies 101 and 201, composite forms A and B are mounted. These forms are designed for the specific articles to be manufactured.

Thermally insulated upper central conduit 110 extends longitudinally the entire length of bed assembly 101, and it is mounted, as seen below, on outer skin member 108. Skin member 108 includes through holes 108' that coincide with the area covered by conduits 110. Lateral conduits 112 and 113 also extend longitudinally substantially the entire length of skin member 108 and the latter has through holes 108" that coincide with the area covered by lateral conduits 112 and 113. As also seen in FIG. 8, through holes 108' and 108" are drilled through skin 108 in the area covered by the upper central conduits 110, respectively, for the hot air to come in.

Similarly, thermally insulated lower central conduit 211 extends longitudinally the entire length of bed assembly 201, and it is mounted, as seen below, to outer skin member 208, at the bottom. As shown in FIG. 8, skin member 208 includes through holes 208' that coincide with the area covered by conduits 211. Lateral conduits 212 and 213 also extend longitudinally substantially the entire length of skin member 208 and the latter has through holes 208" that coincide with the area covered by lateral conduits 212 and 213.

Pressurized hot air (or any other gas) is applied to thermally insulated upper and lower central conduits 110 and 210, respectively. Lateral conduits 112; 113; 212 and 213 are kept at a lower pressure extracting the hot air. The temperature of the air is adjusted depending on the requirements of the user and application with heating assembly 250, as shown in FIG. 9. This closed path for the hot air maintains a predetermined pressure differential to create the desirable air flow and is environmentally compatible.

The pressurized air entering conduits 110 and 210 passes through outer skin holes 108' and 208, through spacer member 109 and 209 and comes in contact with inner skin 107 and out through holes 108" and 208" to conduits 112; 113; 212 and 213. The temperature is thus kept at a substantially uniform gradient during the curing process of the composite form.

As best seen in FIGS. 8 and 9, pressurized hot air is applied to upper and lower central conduits 110 and 210, respectively, with lower pressure applied to lateral conduits 112; 113; 212 and 213 in order to achieve the recirculating air flow shown in FIG. 9. Heating assembly 250 maintains predetermined pressures and temperatures of the air required for a particular application.

When the hot air is passed though the internal components of mold 10, the latter tends to expand (and contract when it cools down). With long objects, these expansions and contractions are substantial. A conventional mold sits on a horizontal plane and the expansions create stresses that attempt to overcome any mechanical harnessing of the mold. As seen in FIGS. 2; 3 and 5, top support mechanism 100 in the present invention includes ribs 117 and 118 (similar to 117 but numbered different to clarify the explanation below), skate or roller assemblies 116 and hook pins 122. Ribs 117 and 118 (as well as ribs 217 and 218) extend transversally across skin members 108 (and 208) and are mounted thereon at a parallel and spaced apart relationship with respect to each other. Ribs 117 and 118 (and 217 and 218) embrace conduits 110; 112 and 113 (conduits 210; 212 and 213, keeping them in place, as seen in FIG. 5. Adhesive 127 is applied to ribs 117 and 118 as well as other fastening members to mount the former to skin members 108 and 208. Additionally, skate or roller assemblies 116 are provided to the ends of supporting legs 124 that in turn are mounted to conduits 112 and 113 on the upper side that freely permit mold 10 to expand and contract when mold 10 is turned over and the curing process starts. The overall result is a mechanism that resembles an accordion and it is less stressful on the different affected components.

Bottom support assembly 200 includes base structure 233 that is kept at a parallel and spaced apart relationship with respect to lower mold 201 with the connection 232 of legs 231, as shown in FIG. 1. Mold 10 is horizontally supported by support assembly 200.

To practice the invention to manufacture a blade for a wind generator, a user places a form to be molded inside two complementary hingedly mounted composite beds 101 and 201 with each including outer complementing skins 108 and 208 and composite inner skins 107 and 207 that complement the former. Through holes 108' are formed in skin 108 that coincide with pressurized hot air in upper conduit 110 and through holes 208' coincide with lower conduit 210. Also, holes 108" and 208" coincide with exhaust lateral conduits 112; 212; 113 and 213. Inner skin member 107 (and 207) is covered by spacer member 109 (and 209) that in the preferred embodiment has a honeycomb shape with internal inter-connecting passages. Outer skin member 108 (and 208) with perforated through holes 108' and 108" is mounted over spacer member 109 (and 209). To start the curing process, the composite beds 101 and 201, with their respective complementing skins, are brought together against each other forming the desired article of manufacture with forms A and B. Pressurized hot air is applied and forced through conduits 110 (and 210), skin 108 (and 208), spacer 109 (and 109), extracted through conduits 112 (and 212) and 113 (and 213) and fed to heating assembly 250 that controls the pressure and temperature that in turn is recirculated and applied to conduits 110 and 210, again. The hot air flows longitudinally through spacer member 109 (and 209) and proceeds laterally to lateral conduits 112; 212; 113 and 213, basically immersing the article being formed in a substantially uniform temperature gradient.

To avoid or minimize the stress associated with the expansions of mold 10, skate or roller assemblies 116 are mounted to conduits 112 and 113 on the upper side of mold 10 which provide a moving support for the entire assembly. Skate assemblies 116 are slidably mounted to and suspended by the arm of mechanism 106. Ribs 117 and 118, as well as ribs 217 and 218 provide support only a particular longitudinal location. Therefore, the entire mold 10 is free to expand when the temperature is raised without undue stress. As shown in FIG. 5, the ribs are mounted directly to skin 108 and support the conduits, with an adhesive 127 that helps also absorb any angular deflection in the short span between ribs. It has been found that using adhesive the resiliency of the ribs is than using other fasteners.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An apparatus for molding blades for wind generators, comprising:
   A) first and second longitudinally extending cooperatively and complimentary mold assemblies hingedly mounted to each other, and capable of being disposed with respect to each other at two extreme positions, one of said extreme positions being closed and the other one open;
   B) first and second longitudinally extending bed assemblies mounted to said first and second mold assemblies, respectively, to each receive composite first and second forms, respectively, each of said first and second bed assemblies including a composite longitudinally extending complementing first skin, a longitudinally extending spacer member coextensive with said first skin having a plurality of interconnecting passages, and a composite longitudinally extending complementing second skin mounted and covering said spacer member and said second skin further including a plurality of through holes connecting to said spacer member;
   C) longitudinally and centrally extending upper and lower conduits mounted over a predetermined member of said through holes of said second skin that are cooperatively located to connect said upper and lower conduits through said second skin to said spacer member;
   D) a pair of longitudinally and laterally extending first and second conduits for said first and second mold assemblies, said first and second conduits being mounted over the remaining of said through holes and connecting said first and second conduits through said second skins to said spacer member; and
   E) a source of pressurized hot air is connected to said upper and lower conduits and to said first and second conduits for selectively supplying pressurized hot air at different pressures and temperatures when said mold assemblies are at the closed position thereby said recirculating said hot air so that the curing rate can be controlled and the temperature is substantially uniform as said pressurized gas passes through said second skins radially outwardly and along the entire length of said spacer member and collected by said first and second conduits.

2. The apparatus set forth in claim 1 wherein said spacer member has a honeycomb configuration.

3. The apparatus set forth in claim 2 wherein said spacer member is made out of aluminum.

* * * * *